United States Patent
Hightower

(10) Patent No.: US 7,228,925 B2
(45) Date of Patent: Jun. 12, 2007

(54) ELECTRICAL SYSTEMS FOR ELECTRIC POWERED VEHICLES

(75) Inventor: Paul Hightower, Granada Hills, CA (US)

(73) Assignee: Tesla Capital, LLC, Bethesda, MD (US)

( * ) Notice: Subject to any disclaimer, the term of this patent is extended or adjusted under 35 U.S.C. 154(b) by 0 days.

(21) Appl. No.: 10/423,455

(22) Filed: Apr. 25, 2003

(65) Prior Publication Data
US 2004/0065488 A1    Apr. 8, 2004

Related U.S. Application Data

(60) Provisional application No. 60/416,171, filed on Oct. 4, 2002.

(51) Int. Cl.
*B60K 1/00*    (2006.01)
(52) U.S. Cl. .................................. 180/65.1; 180/65.4
(58) Field of Classification Search .............. 180/65.1, 180/65.2, 170, 179, 907, 65.8; 364/426.04
See application file for complete search history.

(56) References Cited

U.S. PATENT DOCUMENTS

| | | | | |
|---|---|---|---|---|
| 3,566,985 A | * | 3/1971 | Triplett | 180/214 |
| 3,915,251 A | * | 10/1975 | Kassekert et al. | 180/65.1 |
| 4,180,138 A | * | 12/1979 | Shea | 180/65.2 |
| 4,305,254 A | * | 12/1981 | Kawakatsu et al. | 60/716 |
| 5,161,634 A | * | 11/1992 | Ichihara et al. | 180/179 |
| 5,343,970 A | * | 9/1994 | Severinsky | 180/65.2 |
| 5,489,003 A | * | 2/1996 | Ohyama et al. | 180/65.6 |
| 5,501,292 A | * | 3/1996 | Kawashima et al. | 180/220 |
| 5,819,864 A | * | 10/1998 | Koike et al. | 180/65.1 |
| 6,324,464 B1 | * | 11/2001 | Lee et al. | 701/93 |
| 6,344,732 B2 | * | 2/2002 | Suzuki | 320/132 |
| 6,446,745 B1 | | 9/2002 | Lee et al. | |
| 6,490,511 B1 | | 12/2002 | Raftari et al. | |

\* cited by examiner

*Primary Examiner*—Christopher P. Ellis
*Assistant Examiner*—Bridget Avery
(74) *Attorney, Agent, or Firm*—Craig Gelfound; McDermott Will & Emery, LLP

(57) ABSTRACT

Systems and techniques are disclosed relating to electric motor applications. The systems and techniques are described in the context of an electric powered vehicle. The electric powered vehicle includes a drive wheel, an electric motor configured to rotate the drive wheel by delivering power thereto, a speed sensor configured to monitor rotational speed of the drive wheel, and a controller configured to limit the power delivered to the drive wheel to a maximum level over a range of rotational speeds monitored by the speed sensor.

19 Claims, 7 Drawing Sheets

PERFORMANCE MATRIX

| RESISTANCE | POWER | TOP SPEED | RANGE |
|---|---|---|---|
| 2200 Ω | 1.5 HP | 12 MPH | 30 MILES |
| 2700 Ω | 2.0 HP | 14-15 MPH | 40 MILES |
| 3100 Ω | 3.0 HP | 18-20 MPH | 45 MILES |
| 4000 Ω | 5.0 HP | 23-27 MPH | 50 MILES |

ELECTRICAL SYSTEMS FOR ELECTRIC POWERED VEHICLES

CROSS-REFERENCE TO RELATED APPLICATIONS

The present application claims priority under 35 U.S.C. § 119(e) to provisional Application No. 60/416,171, filed Oct. 4, 2002, the contents of which is expressly incorporated herein by reference.

BACKGROUND

1. Field

The present invention relates generally to electric motor applications, and more specifically, to electric motor applications for electric powered vehicles.

2. Background

Recently, due to the shortage of gasoline and the ecological consequences of such use, various proposals have been created dealing with alternative power sources for motor vehicles. One of the most popular and promising proposals relates to electric powered vehicles. The difficulty encountered with electric powered vehicles, however, is the inability to deliver sufficient power for long-range operation without utilizing an extremely large number of heavy batteries. The electric motor driven cycle, on the other hand, is substantially lighter than the automobile, and therefore, tends to have significantly lower power requirements. As a result, electric motor driven cycles, such as motorcycles and mopeds, are ideal for electric power applications.

Whether the electric motor driven cycle is classified as a motorcycle or moped may have significant implications. A motorcycle, for example, requires that the driver has a special license and that the motorcycle be registered with the state. Mopeds, on the other hand, typically do not require that the driver have a license and does not require state registration. Therefore, it is commercially advantageous for a manufacturer to be able to classify the electric motor driven cycle as moped. The classification is often based on the maximum horsepower of the vehicle and is often different in each state. This presents a significant challenge to manufacturers seeking to achieve a standardized design.

A standardized design could be achieved by selecting a motor with the lowest horsepower rating of any state in the nation for a moped classification. The problem with this approach is that the performance of the electric motor driven cycle may be less than optimal in states where the horsepower rating for mopeds in substantially higher. Alternatively, the electric motor driven cycle may be designed to operate with different motors depending on the state in which the classification of the vehicle will be made. This approach will allow the electric motor driven cycle to operate at the maximum horsepower allowed by any particular state, but may result in various commercial disadvantages to the manufacturer in terms of inventory management, quality testing, maintenance, and the like.

Another consideration that may impact on the performance of the electric motor driven cycle designed for a moped classification is the manner in which the maximum horsepower is measured by the state. The state measures what is commonly referred to as the maximum brake-horsepower of the vehicle. This measurement can be made by applying a varying load to the drive wheel at full throttle and measuring the force applied by the drive wheel to the load at different speeds. The horsepower can then be computed by means well known in the art and plotted at different drive wheel speeds to generate a horsepower curve. The peak horsepower, which is the maximum brake-horsepower used by the state to classify the vehicle, can be determined from the horsepower curve. A typical horsepower curve looks like a parabola. Depending on certain parameters of the motor, the peak horsepower delivered by the motor may occur at the mid-point of the motor's operational RPM range. In limited horsepower applications, horsepower delivered below the peak drops and limits the starting power available to move the vehicle, and top speed is limited by load.

Accordingly, there is a need in the art for improvements in electric motor control technology that can deliver the maximum horsepower to the drive wheel under varying load conditions. This technology should be adaptive to comply with the maximum horsepower requirement of each state.

SUMMARY

In one aspect of the present invention, an electric powered vehicle is configured to operate without exceeding a maximum horsepower. The electric powered vehicle includes a drive wheel, an electric motor having a horsepower rating greater than the maximum horsepower, the electric motor being configured to rotate the drive wheel, a throttle configured to produce a throttle voltage, a speed sensor configured to monitor rotational speed of the drive wheel, and a controller configured to determine the maximum voltage that can be applied to the electric motor at the current rotational speed of the drive wheel without exceeding the maximum horsepower, and limit the throttle voltage applied to the electric motor to the maximum voltage.

In another aspect of the present invention an electric powered vehicle includes a drive wheel, an electric motor configured to rotate the drive wheel, a throttle configured to produce a throttle voltage, a speed sensor configured to monitor rotational speed of the drive wheel, and a controller configured to determine the voltage required by the electric motor to produce a target torque at the current rotational speed of the drive wheel when such speed is less than a threshold speed, and set the throttle voltage to such voltage.

In yet another aspect of the present invention, a method of controlling an electric powered vehicle configured to operate without exceeding a maximum horsepower includes rotating a drive wheel with an electric motor having a horsepower rating greater than the maximum horsepower, monitoring the rotational speed of the drive wheel, determining the maximum voltage that can be applied to the electric motor at the current rotational speed of the drive wheel without exceeding the maximum horsepower, producing a throttle voltage, and limiting the throttle voltage applied to the electric motor to the maximum voltage.

In a further aspect of the present invention, a method of controlling an electric powered vehicle includes rotating a drive wheel with an electric motor, monitoring the rotational speed of the drive wheel, determining the voltage required by the electric motor to produce a target torque at the current rotational speed of the drive wheel, and setting the throttle voltage to such voltage.

In a further aspect of the present invention, an electric powered vehicle is configured to operate without exceeding a maximum horsepower. The electric powered vehicle includes a drive wheel, a throttle, an electric motor having a horsepower rating greater than the maximum horsepower, the electric motor being configured to rotate the drive wheel in response to an input from the throttle, a speed sensor configured to monitor rotational speed of the drive wheel, and a controller configured to limit the throttle input to the electric motor to ensure that the torque produced by the electric motor does not exceed the maximum horsepower at the current rotational speed of the drive wheel.

In yet a further aspect of the present invention, an electric powered vehicle includes a drive wheel, a throttle, an electric motor configured to rotate the drive wheel in response to an input from the throttle, a speed sensor configured to monitor rotational speed of the drive wheel, and a controller configured to determine the throttle input required by the electric motor to produce a target torque at the current rotational speed of the drive wheel when such speed is less than a threshold speed, and set the throttle input thereto.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

The following detailed description is directed to various systems and techniques relating the control of an electric motor for delivering optimal power to the drive wheel of an electric powered vehicle under varying load conditions. However, as those skilled in the art will readily appreciate, these systems and techniques are likewise applicable for use in various other electric motor applications. By way of example, electric motors used in automobiles, household appliances, information systems, robotics, toys, vision and sound equipment, medical and healthcare equipment, and so on, may benefit from many of the inventive concepts described throughout this disclosure. Accordingly, any reference to an electric powered vehicle or electric motor driven cycle is intended only to illustrate the inventive aspects, with the understanding that such inventive aspects have a wide range of applications.

Figure 1:
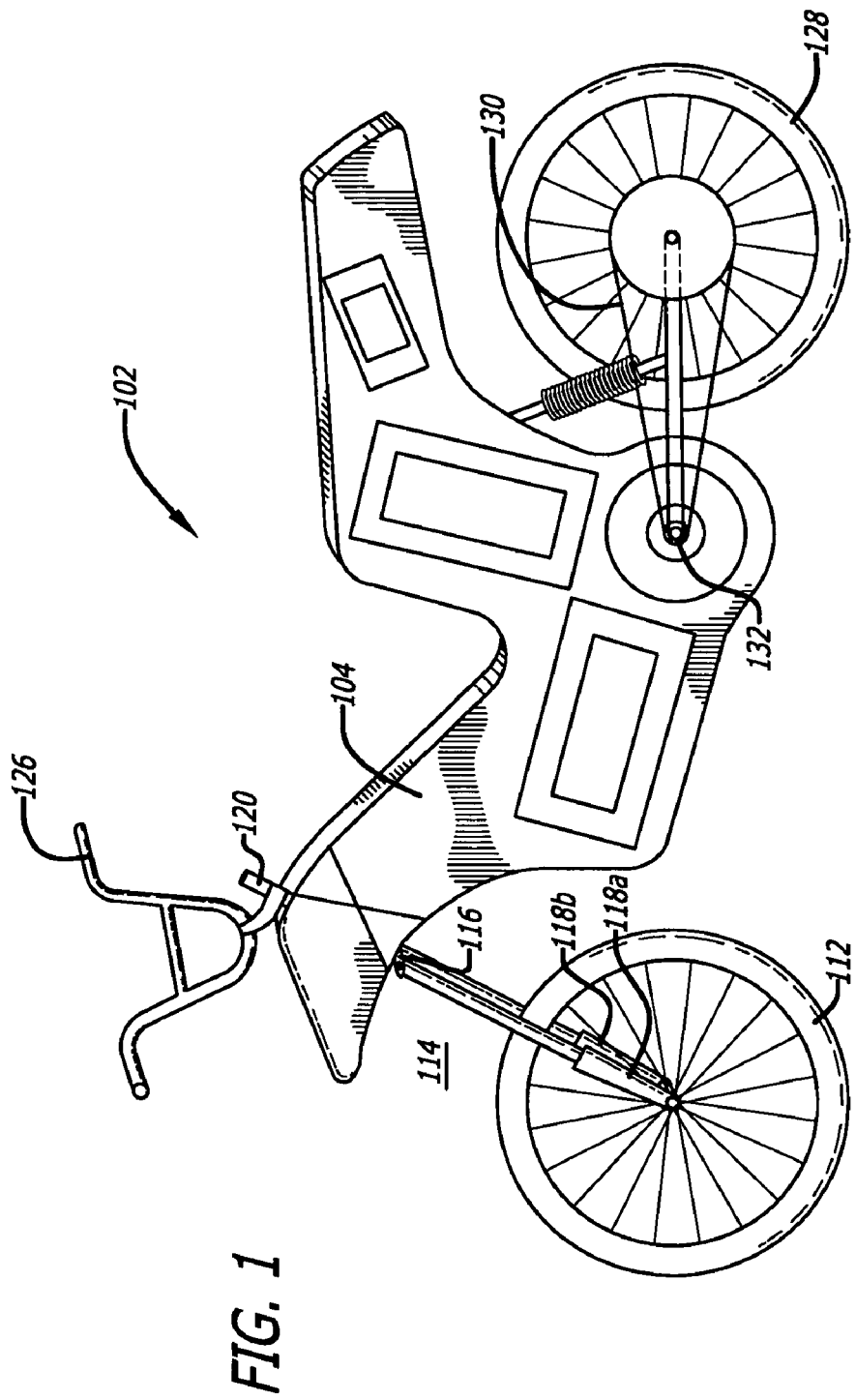
FIG. 1 is a perspective view of an embodiment of an electric motor driven cycle.

FIG. 1 is a perspective view of an embodiment of an electric powered vehicle commonly known as an electric motor driven cycle. The electric motor driven cycle 102 may be based on a fully suspended and dampened frame design. The frame 104 may be coupled to a front wheel 112 with a fork assembly 114. The fork assembly 114 may include a bifurcated member 116 with right and left spring-loaded damping tubes 118a and 118b which extend downward to form a front fork. The axle of the front wheel may be inserted into the front fork. A steered tube 120 extending upward from the center of the bifurcated member 116 may be rotatably inserted through the frame 104. A clamp may be used to couple the steered tube 120 to a handlebar 126. Mechanical power may be delivered to a rear wheel 128 with a drive belt 130 between an electric motor 132 and the rear wheel 128.

Figure 2:
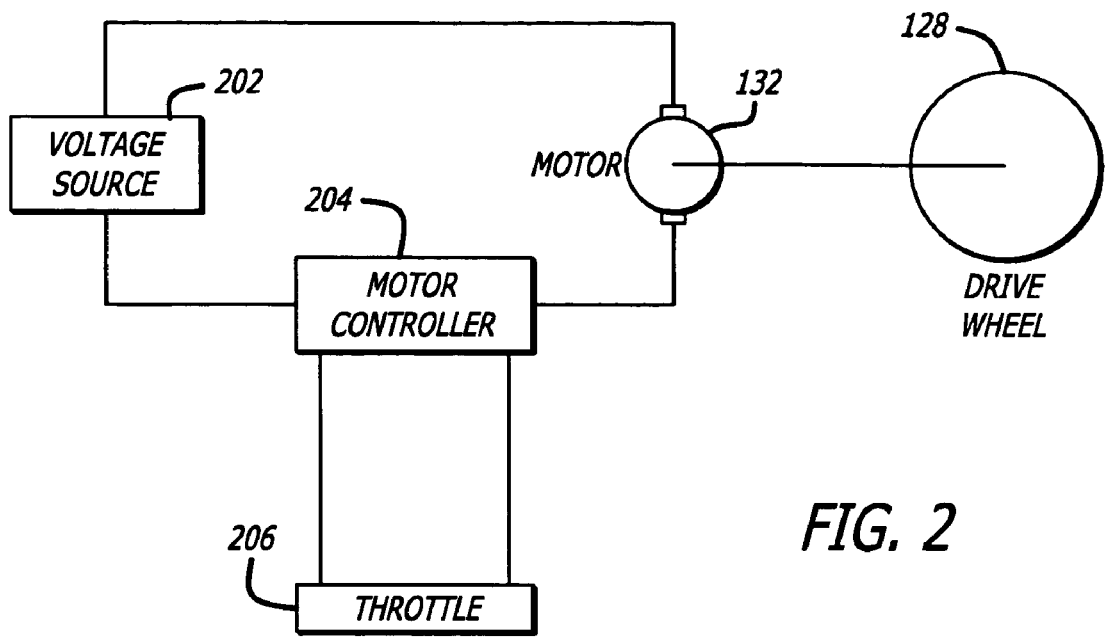
FIG. 2 is a functional block diagram of an embodiment of an electrical system for an electric motor driven cycle.

FIG. 2 is an embodiment of an electrical system for controlling the torque of the electric motor 132. The torque produced by the electric motor 132 may be transferred to the rear wheel 128 by the drive belt to move the vehicle forward. A voltage source 202, such as a battery, may be used to drive the electric motor 132. The voltage applied to the electric motor 132 may be dynamically controlled by a motor controller 204. The motor controller 204 allows the driver of the vehicle to control the torque produced by the electric motor 132 with a throttle 206. The throttle 206 may be a potentiometer or any other device that can deliver a variable voltage to the motor controller 204 under driver control. The motor controller 204 may be any device that can control the voltage applied to the electric motor 132, such as a pulse width modulator or any other motor controller known in the art.

The electrical system described in connection with FIG. 2 may be modified in various ways to regulate the torque output of the electric motor. The various modifications that will be described are well suited for use in an electrical system of an electric motor driven cycle designed for a moped classification, however, such modifications are not limited to such applications. The systems and techniques used to implement these modifications are equally applicable to various other electric motor applications, and those skilled in the art will be readily able to adapt such systems and techniques to any specific application based on the teachings herein.

The modified electrical system begins with the selection of the electric motor. In at least one embodiment, an electric motor is selected with the highest horsepower rating of any state in the nation for a moped classification. Circuitry may then be introduced into the electrical system to limit the maximum horsepower delivered by the electric motor to the rear wheel in states where the maximum brake-horsepower rating for a moped classification that is less than the nation's highest. The circuitry may be programmable so that the maximum horsepower can be set at the factory or dealer in accordance with the appropriate state requirements.

Figure 3:
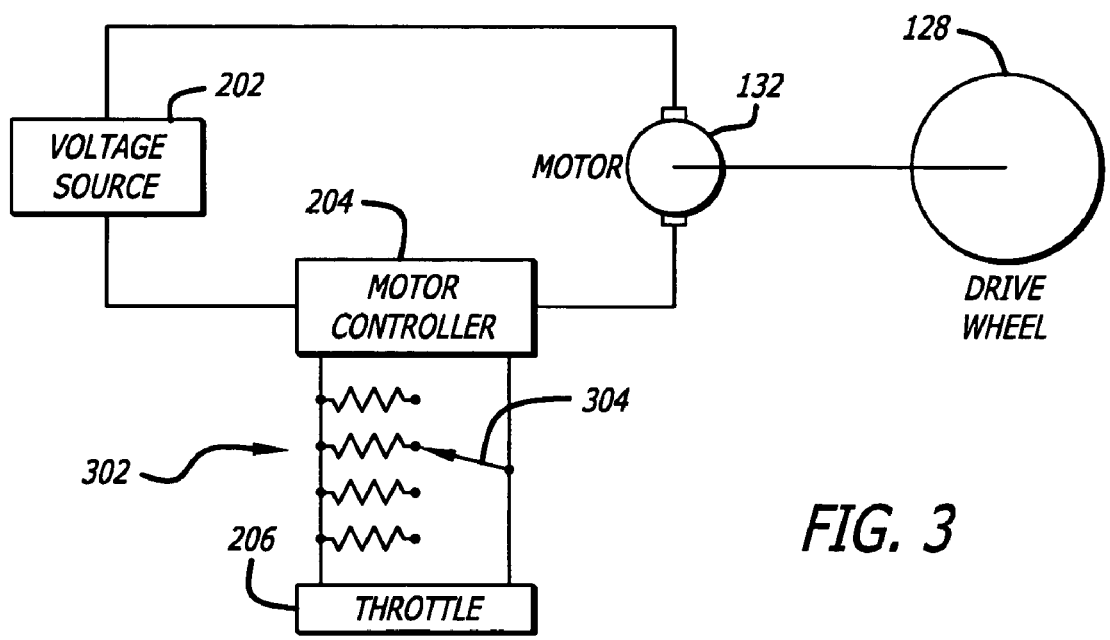
FIG. 3 is a functional block diagram of an embodiment of an electrical system with a resistor array for an electric motor driven cycle.

FIG. 3 is example of a modified electrical system with a switching resistor array 302 which may be used to set the maximum horsepower of the vehicle. The switching resistor array may be connected in parallel across the throttle 206. The switching resistor array 302 includes any number of resistors that can be switched into the motor controller 204 circuit either with a jumper wire 304 or by any other means. The switching resistor array 302 may be used to limit the full voltage range of the throttle 206. By way of example, if the full voltage range of the throttle 206 is 0–5 volts, then the motor controller 204 should be calibrated to equate 5 volts to full throttle. By switching one or more resistors from the switching resistor array 302 into the motor controller 204 circuit, the voltage range of throttle 206 may be limited. As a result, the throttle 206 will deliver a voltage to the motor controller 204 that is less than 5 volts at full throttle. The motor controller 204 will respond to this throttle voltage by applying less than the maximum voltage from the voltage source 202 to the electric motor.

Figures 4, 5:
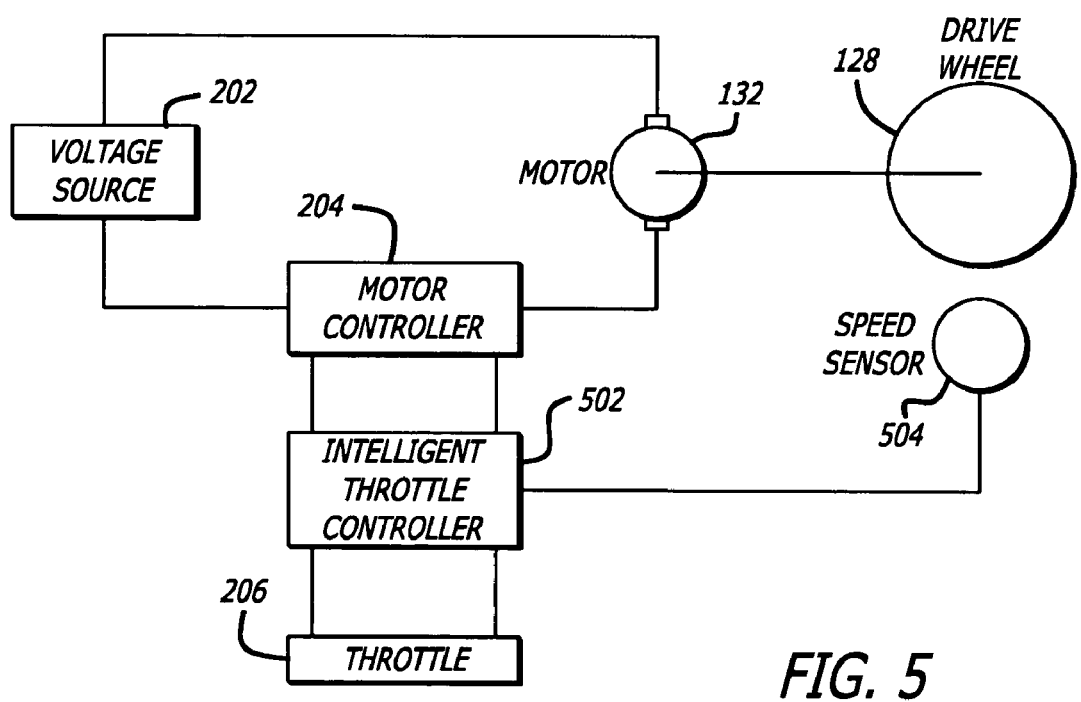
FIG. 4 is an example of a performance matrix for the electric motor driven cycle of FIG. 3.
FIG. 5 is a functional block diagram of an embodiment of an electrical system with an intelligent throttle controller for an electric motor driven cycle.

The parallel arrangement of the switching resistor array 302 is compatible with a model 1204 motor controller, manufactured by Curtis Instruments. Other arrangements of the switching resistor array 302 may also be used depending on the specific configuration of the motor controller 204 and throttle 206. In some embodiments, the switching resistor array 302 may be coupled in series between the motor controller 204 and the throttle 206. In other embodiments, the switching resistor array 302 may be integrated into either the motor controller 204 or the throttle 206. Those skilled in the art will be able to readily determine the manner in which the switching resistor array 302 should be coupled to the throttle 206 to limit the full voltage range input to the motor controller 204. The resistor values for the switching resistor array 302 may be determined empirically, by simulation, by analysis, and/or by any other means known in the art. The appropriate resistor or resistors may be switched into the motor controller 204 circuit at the factory or the dealer in accordance with the appropriate state requirements. FIG. 4 is a performance matrix of an exemplary set of resistor values for use with a Curtis Model 1204 motor controller.

An alternative embodiment of the electrical system will be described in connection with FIG. 5. However, before describing this alternative embodiment, it is useful to briefly discuss the relationship between torque produced by the electrical motor 132 and horsepower delivered to the rear wheel. This relationship can be expressed by the following equation:

$$\text{Horsepower}=(\text{Torque}\times\text{RPM})/K \quad (1)$$

where: RPM is the speed of the drive wheel measured in rotations-per-minute;
Torque is in pound-feet; and
K is a constant equal to 5,252.

An electric motor driven cycle designed for a moped classification needs to regulate the horsepower delivered to the rear wheel of the vehicle to ensure that it does not exceed the state regulations under all loading conditions. From equation (1), one can readily see that the maximum torque output of the electric motor is limited by the maximum brake-horsepower at full speed. Torque in motors varies due to a number of factors. In an ideal motor, torque is maximum at zero RPM (stall) and falls linearly with increasing RPM. Torque decreases for a number of reasons, but the most dominant is the development of a back electromagnetic force (EMF) within the motor due to the rotation of rotor windings within the magnetic field of the motor. Torque in a motor is directly proportional to current flowing through the windings. When a fixed voltage is applied to the motor and RPM increases, the back EMF generated by the motor opposes the applied voltage. As a result, the net effective voltage across the windings is reduced and so is the current flowing in the motor. In this situation, the horsepower delivered by the motor is then given by $$\text{Horsepower}=(V_{applied}-K_e\times\text{RPM})/R_{DC}\times\text{RPM}/5252 \quad (2)$$

where: $K_e$=a proportionality factor of the back EMF voltage develop per RPM of the motor; and
$R_{DC}$ is the DC resistance of the motor and power delivery circuitry.

This equation yields a horsepower function that begins at zero, rises to a maximum value and once again falls to zero when the back EMF equals the applied voltage $V_{applied}$. Consequently, the peak horsepower limitations of the electric motor may result in significantly less horsepower being delivered to the rear wheel at low speeds and at high speeds. As a result, the vehicle may be starved for power when rear wheel loading suddenly increases and may fail also to achieve a desired top speed. By way of example, if the vehicle begins ascending up a steep incline, the electric motor may not be able to develop enough torque to propel the vehicle forward. Or if the vehicle can start, top speed may be limited at the RPM of maximum horsepower. This RPM might be at half speed as implied by the ideal motor equation (2).

In the embodiment shown in FIG. 5, a high torque electric motor may be selected, which is capable of delivering higher than maximum horsepower to the rear wheel. An intelligent throttle controller 502 may be used in place of the switching array resistor to manage the horsepower delivered to the rear wheel within the maximum brake-horsepower limits as the speed of the vehicle increases. This technique permits the electrical system to deliver the maximum horsepower over a broad range of speeds rather than at a single speed. Although shown as a separate entity, those skilled in the art will recognize that the functionality of the intelligent throttle control may integrated into the motor controller 204.

The functionality of the intelligent throttle controller, whether configured as a separate entity or integrated into the motor controller 204, may be implemented in software capable of being executed on a processor. The processor may be a general purpose processor, a specific application processor, or any other software execution environment. The software may reside in RAM memory, flash memory, ROM memory, EPROM memory, EEPROM memory, registers, a hard disk, a removable disk, a CD-ROM, or any other storage medium known in the art, either on the processor or external to the processor. Alternatively, the functionality of the intelligent throttle controller may be in hardware or in any combination of hardware and software. By way of example, the intelligent throttle control function may be implemented with an application specific integrated circuit (ASIC), field programmable gate array (FPGA) or other programmable logic device, discrete gate or transistor logic, discrete hardware components, any combination thereof, or any other equivalent or nonequivalent structure designed to perform one or more of the intelligent throttle control functions. It is to be understood that the any reference to a intelligent throttle controller may embrace all possible implementations discussed above as well as embodiments that would be apparent to those skilled in the art.

The intelligent throttle controller 502 may use feedback to limit the horsepower delivered to the rear wheel 128 to the maximum horsepower allowed by state under varying load conditions. The feedback may be provided by a speed sensor 504. The speed sensor 504 may be an optical encoder operable by a pulley attached to the drive belt. In this configuration, the optical encoder can measure the speed of the drive belt that is directly proportional to the speed of the drive wheel. Alternatively, the speed sensor 504 may be a photoencoder positioned near the rear wheel and configured to use the existing holes in the brake disc to pass and block light from a light source. The interrupted light signals can then be fed back to the intelligent throttle controller 502

Figure 6:
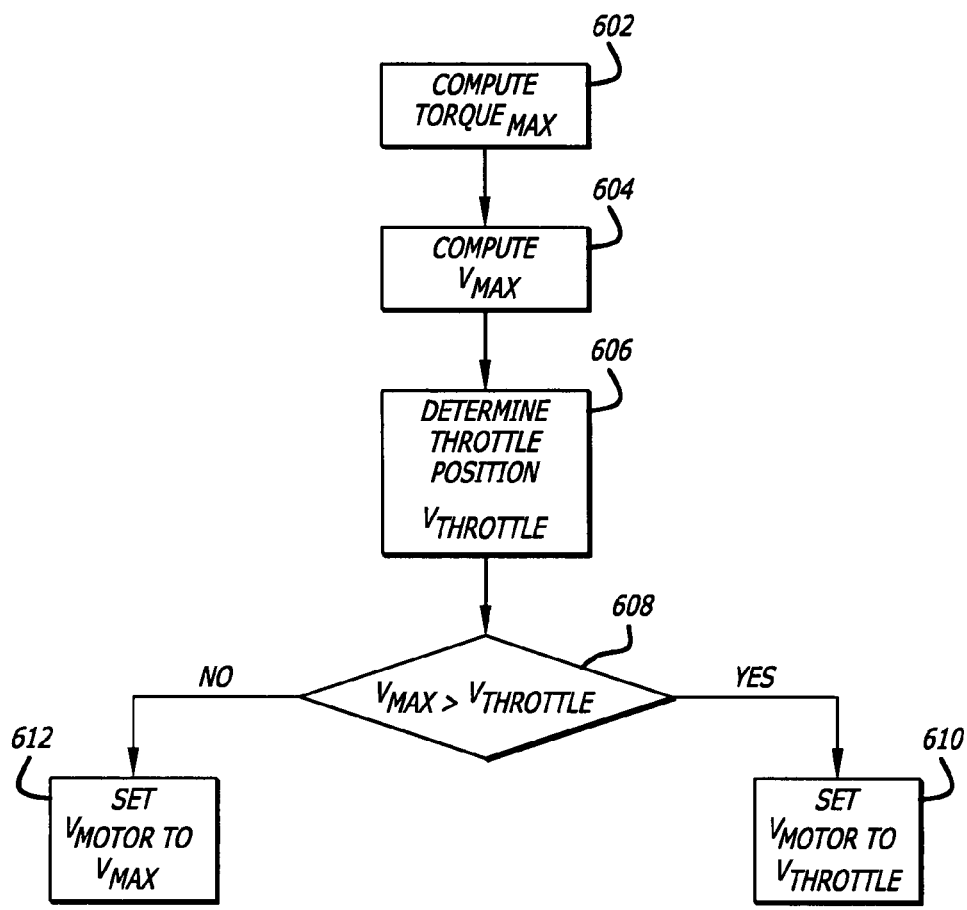
FIG. 6 is a flow chart illustrating the operation of an embodiment of the intelligent throttle controller.

FIG. 6 is a flow diagram illustrating the functionality of the intelligent throttle controller. In step 602, the intelligent throttle controller may compute the maximum allowable torque that can be produced by the electric motor without exceeding the maximum horsepower at the rear wheel using equation (2) and the feedback from the speed sensor. In step 604, the voltage required to be applied to the electric motor to generate the maximum allowable torque may be computed using the following equation:

$$V_{max} = (HP_{max} \times 5252 \times R_{DC}/RPM \times K_t) + V_{back\text{-}emf} \quad (3)$$

where: $HP_{max}$ is the maximum allowable horsepower
$K_t$ is the torque constant of the electric motor;
$R_{DC}$ is the DC resistance of the electric motor and feed circuits; and
$V_{back\text{-}emf}$ is the back EMF developed by the electric motor, which may be computed by multiplying the speed of the motor in RPMs by the EMF constant of the electric motor.

The voltage $V_{max}$ computed using equation (3) represents the maximum voltage that can be applied to the electric motor at the current speed without exceeding the horsepower limits.

In step 606, the position of the throttle may be determined by a throttle voltage ($V_{throttle}$) produced by an analog interface. The analog interface should be designed so that the throttle position tracks the full voltage range that can be applied to the electric motor. By way of example, if the full voltage range that can be applied to the electric motor is 12 volts, then a throttle position half way to full throttle should result in 6 volts being applied to the electric motor. Of course, the computations performed by the intelligent throttle controller will most likely be made in the digital domain, and therefore, various scaling operations may need to be performed to convert the voltage produced by the throttle to the voltage applied to the electric motor. These various scaling operations may be different depending on whether the intelligent throttle controller is integrated into the motor controller or implemented as a separate entity between the throttle and motor controller. These various scaling operations are trivial, and well within the capabilities of one skilled in the art. For simplicity, the remaining discussion relating to the intelligent throttle controller will omit any reference to scaling operations, and equate the throttle voltage ($V_{throttle}$) to the voltage applied to the electric motor ($V_{motor}$).

In step 608, the voltage produced by throttle $V_{throttle}$ may be compared to the maximum allowable voltage $V_{max}$ computed from equation (3). As long as the throttle voltage $V_{throttle}$ is below the maximum allowable voltage $V_{max}$, then the throttle voltage $V_{throttle}$ may be used to control the voltage applied to the electric motor from the voltage source in step 610. However, should the throttle voltage $V_{throttle}$ exceed the maximum allowable voltage $V_{max}$, then the intelligent throttle controller may limit the voltage applied to the electric motor from the voltage source to the maximum allowable voltage $V_{max}$, in step 612, independent of the throttle position.

Figure 7:
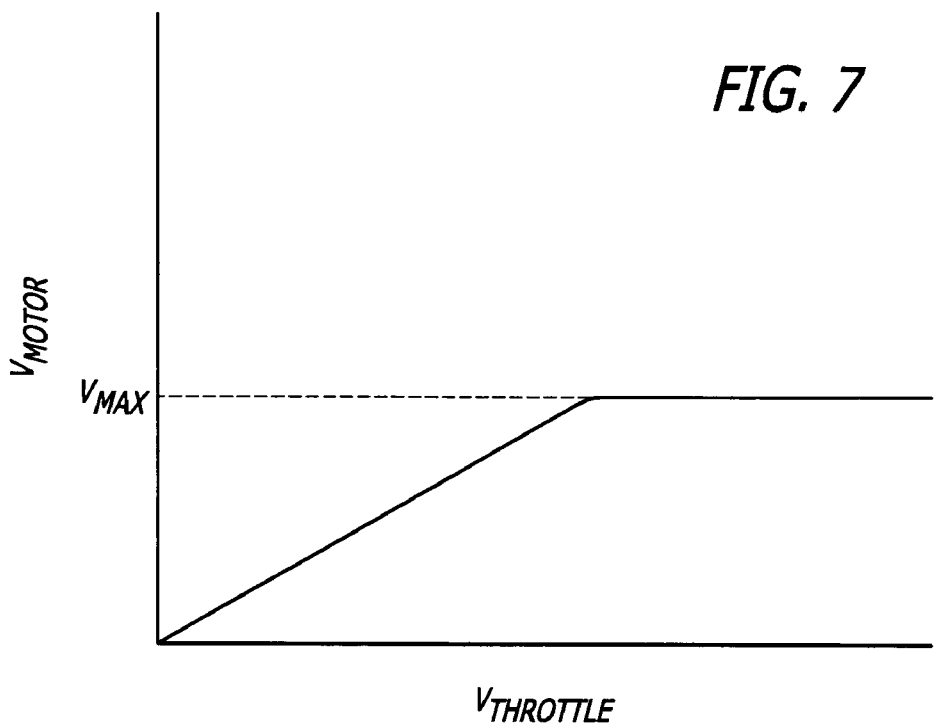
FIG. 7 is a graph showing the relationship between the throttle voltage and the voltage applied to the electric motor in accordance with an embodiment of an electric motor driven cycle.

FIG. 7 is a graph showing the relationship between the throttle voltage $V_{throttle}$ and the voltage applied to the electric motor $V_{motor}$. Referring to FIG. 7, the voltage applied to the electric motor $V_{motor}$ tracks the throttle voltage $V_{throttle}$ until the throttle voltage reaches the maximum voltage $V_{max}$. Once the throttle voltage $V_{throttle}$ reaches the maximum voltage $V_{max}$, the voltage applied to the electric motor $V_{motor}$ is limited to the maximum voltage $V_{max}$.

The intelligent throttle controller described thus far may provide extremely high torque at low speeds. This may be of significant benefit to overcome sudden increases in rear wheel loading with large increases in torque. This increase in torque may provide sufficient power delivery to the rear wheel to propel the vehicle up a steep incline. Moreover, the intelligent throttle controller may allow extremely high starting torque making the vehicle more responsive off the line. Lastly, using a high horsepower motor managed with the intelligent throttle controller also may extend the maximum RPM that the motor can achieve in high load situations as compared to a motor with maximum horsepower rating operating without such controller could achieve.

Figure 8:
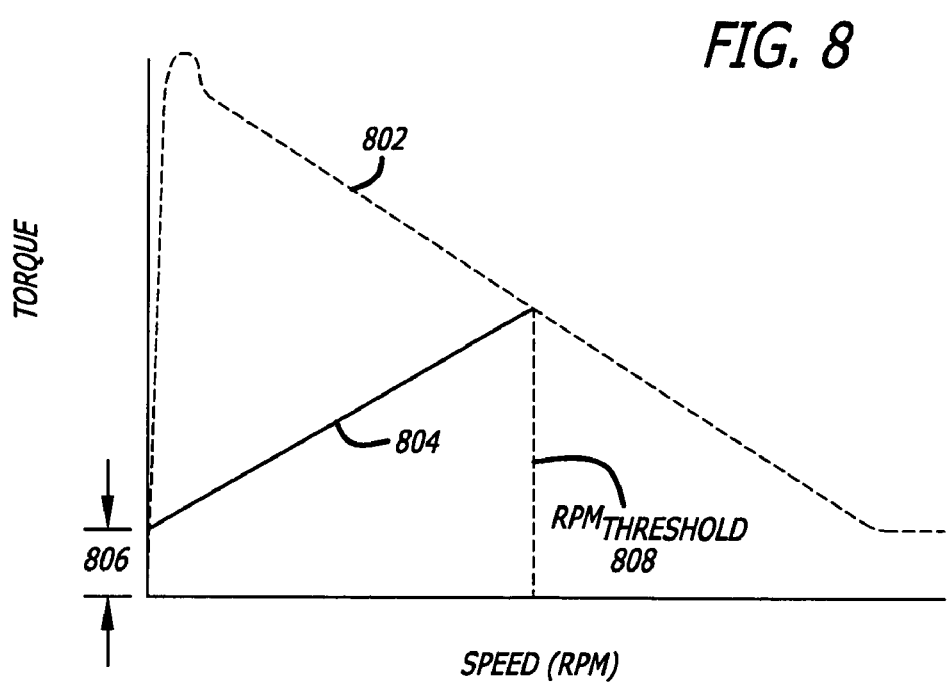
FIG. 8 is a graph showing the relationship between the torque produced by the electric motor and the speed of the vehicle in accordance with an embodiment of an electric motor driven cycle.

In at least one embodiment of the intelligent throttle controller, the acceleration profile of the vehicle may be controlled to prevent abrupt starts due to the high torque output of the electric motor at low speeds. FIG. 8 is a graph showing the relationship between the torque produced by the electric motor and the speed of the vehicle in RPMs. A torque curve 802 is shown which rises sharply at low speeds. As a result, the electric motor driven cycle may experience undesirable acceleration bursts off the line and compromise low speed control of the vehicle. The intelligent throttle controller may be used to control the rising edge of the torque curve as shown by the modified portion of the torque curve 804 at low speeds. The slope of the rising edge of the torque curve, or the rate of change of torque with speed, may be managed by the intelligent throttle controller below a threshold speed ($RPM_{threshold}$) 808. The slope of the rising edge of the torque curve may be different depending on the particular application and the overall design constraints of the electrical system. An offset 806 may introduced into the torque curve at to provide sufficient starting torque. The offset 806 may fixed or dynamically adjusted. A dynamically adjusted offset 806 may be configured with a relatively conservative offset to ensure a smooth start. The feedback from the speed sensor may be used to incrementally increase the offset 806 if the vehicle is not accelerating. This approach may be particularly attractive in situations where the load is considerably high, such as starting the vehicle on a steep incline. In this case, the offset 806 may be incrementally increased as necessary up to maximum torque that can be produced by the electric motor.

Figure 9:
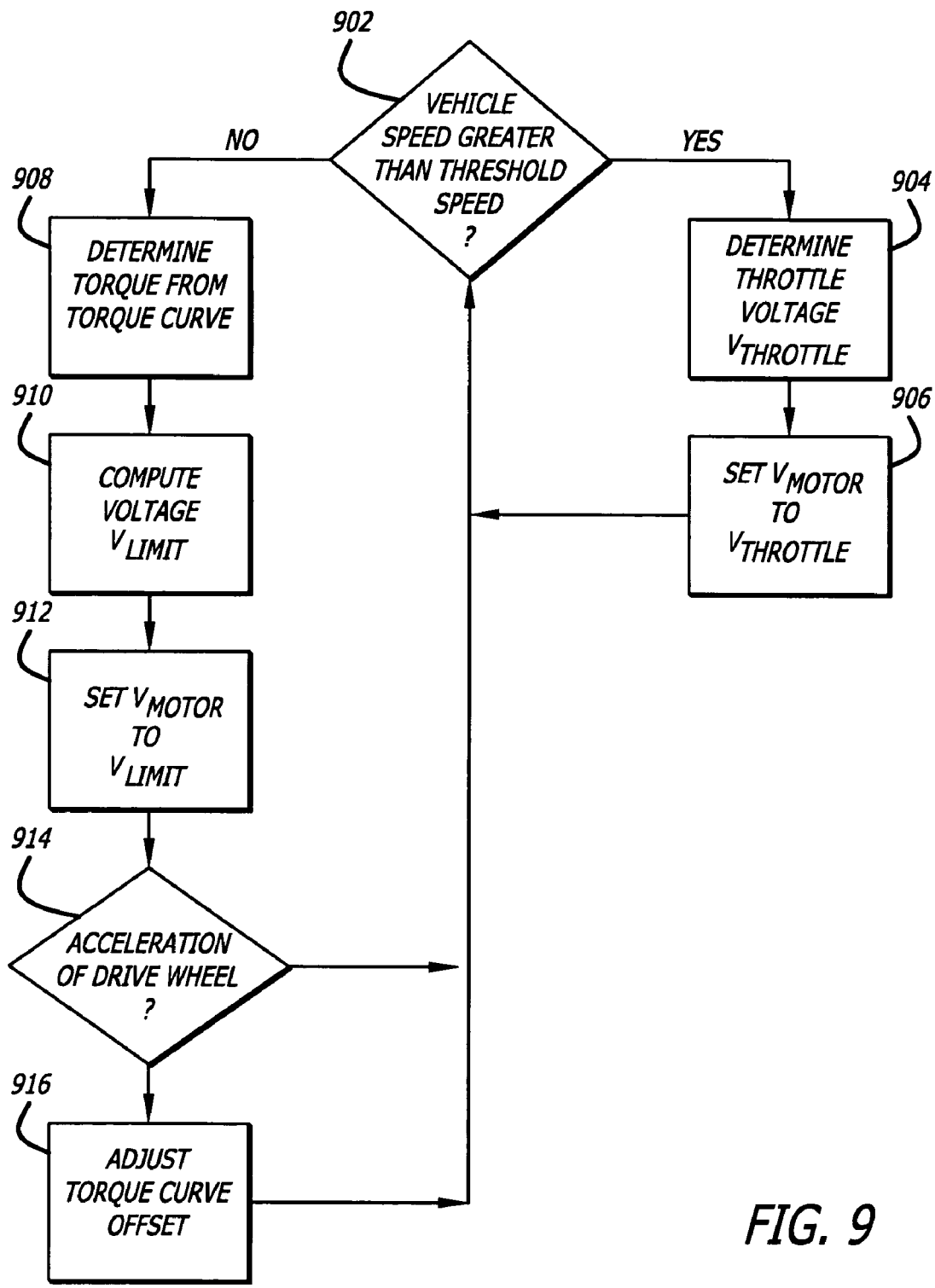
FIG. 9 is a flow chart illustrating a further operation of an embodiment of the intelligent throttle controller.

FIG. 9 is a flow diagram illustrating the operation of an acceleration control feature integrated into at least one embodiment of the intelligent throttle controller. In step 902, the intelligent throttle controller may determine from the speed sensor whether the speed of the vehicle is greater than the threshold speed ($RPM_{threshold}$). If the vehicle speed is greater than the threshold speed ($RPM_{threshold}$), then the throttle voltage $V_{throttle}$ may be computed in step 904, and used to control the voltage applied to the electric motor $V_{motor}$ in step 906. If, on the other hand, the vehicle speed is less than or equal to the threshold speed ($RPM_{threshold}$), then the maximum allowable torque at the current speed may be derived in step 908 from a torque curve, such as the torque curve 804 shown in FIG. 8. The torque curve may be programmed into the intelligent throttle controller in the form of a look-up table, or alternatively be in the form of an algorithm. Either way, the voltage ($V_{limit}$) required to generate the maximum allowable torque may be computed from equation (3) in step 910. The intelligent throttle controller may limit, in step 912, the voltage applied to the electric motor $V_{motor}$ to the computed voltage $V_{limit}$ to achieve the maximum allowable torque.

As long as the intelligent throttle controller is limiting the voltage applied to the electric motor to $V_{limit}$, feedback from the speed sensor may be used in step 914 to determine whether the electric motor driven cycle is accelerating. If the feedback from the speed sensor indicates that the vehicle is accelerating, then the intelligent throttle controller loops back to step 902 and continues its acceleration control function. If, on the other hand, the feedback from the speed sensor indicates that the vehicle is not accelerating, the intelligent throttle controller may adjust the offset of the torque curve in step 916 before looping back to step 902.

Figure 10:
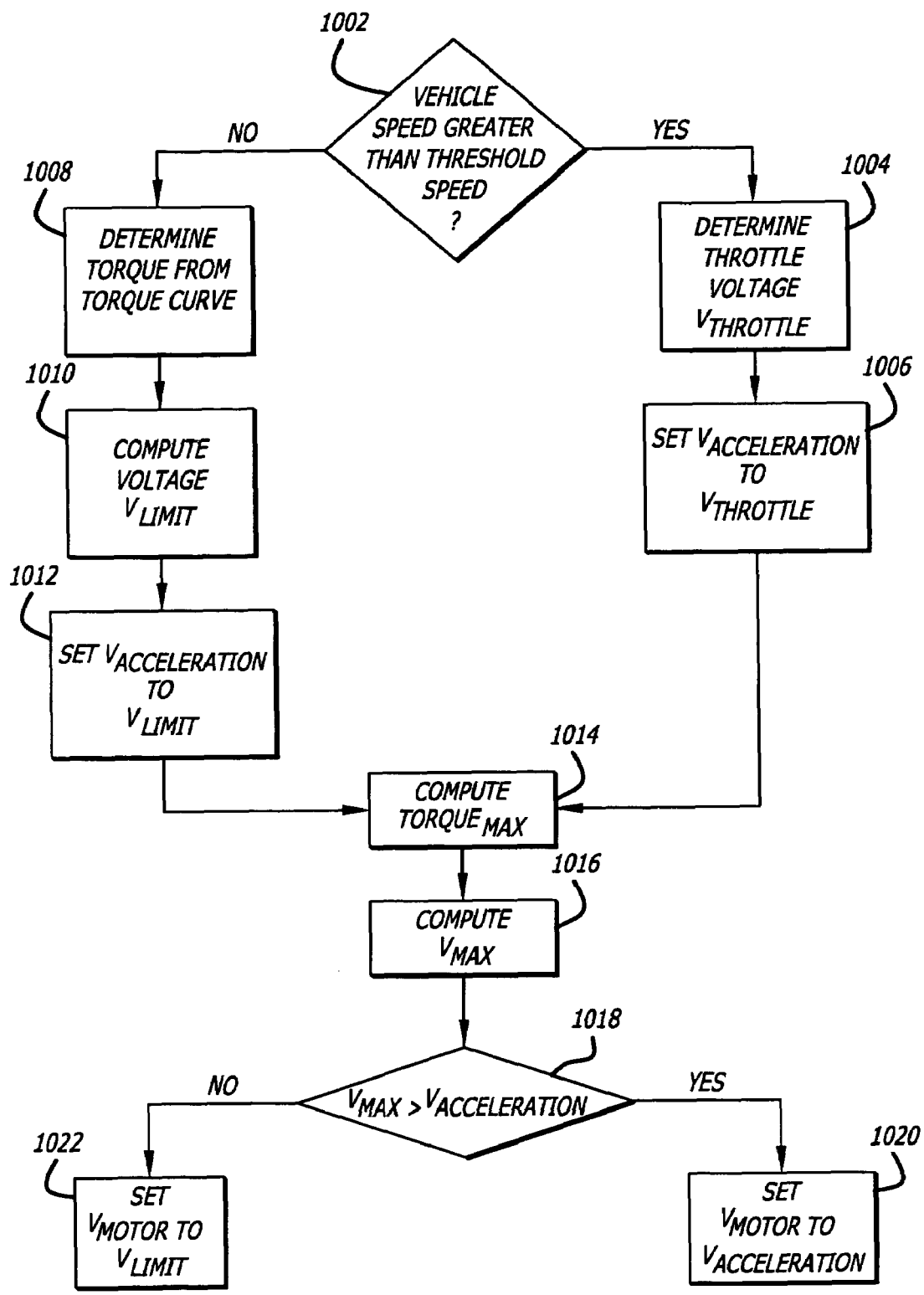

The intelligent throttle controller may be configured to limit both the acceleration of the vehicle as well as the horsepower. These features may be implemented together in a variety of ways. By way of example, the acceleration control feature may be cascaded with the horsepower control feature. A flow diagram illustrating an embodiment of an intelligent throttle controller with both acceleration and horsepower control features is shown in FIG. 10.

In step 1002, the intelligent throttle controller may determine from the speed sensor whether the speed of the vehicle is greater than the threshold speed ($RPM_{threshold}$). If the vehicle speed is greater than the threshold speed ($RPM_{threshold}$), then the throttle voltage $V_{throttle}$ may be computed in step 1004, and an acceleration voltage $V_{acceleration}$ set to the throttle voltage in step 1006. If, on the other hand, the vehicle speed is less than or equal to the threshold speed ($RPM_{threshold}$), then the maximum allowable torque at the current speed may be derived in step 1008 from a torque curve, such as the torque curve 804 shown in FIG. 8. The voltage ($V_{limit}$) required to generate the maximum allowable torque may be computed from equation (3) in step 1010, and the acceleration voltage $V_{acceleration}$ set to the computed voltage $V_{limit}$ in step 1012. This completes the acceleration control function.

Next, in step 1014, the intelligent throttle controller may compute the maximum allowable torque that can be produced by the electric motor without exceeding the maximum horsepower at the rear wheel using equation (2) and the feedback from the speed sensor. In step 1016, the voltage $V_{max}$ required to be applied to the electric motor to generate the maximum allowable torque may be computed using equation (3). The voltage $V_{max}$ computed using equation (3) represents the maximum voltage that can be applied to the electric motor at the current speed without exceeding the horsepower limits. In step 1018, the acceleration voltage $V_{acceleration}$ may be compared to the maximum allowable voltage $V_{max}$ computed from equation (3). As long as the acceleration voltage $V_{acceleration}$ is below the maximum allowable voltage $V_{max}$, then the acceleration voltage $V_{acceleration}$ may be used to control the voltage applied to the electric motor in step 1020. However, should the acceleration voltage $V_{acceleration}$ exceed the maximum allowable voltage $V_{max}$, then the intelligent throttle controller may limit the voltage applied to the electric motor to the maximum allowable voltage $V_{max}$, in step 1022.

Certain features of the intelligent throttle controller have been described in connection with the flow charts shown in FIGS. 6, 9 and 10. These flow charts have been used to illustrate several embodiments of the intelligent throttle controller with the understanding that the underlying invention may take on various forms. In connection with the specific embodiments described, those skilled in the art will appreciate that the sequence of steps or procedures are given by way of example and are not intended to limit the invention in any way. These steps or procedures may be performed in different orders, with some steps or procedures being performed in parallel. Moreover, one or more of these steps or procedures may be omitted or combined with any other techniques known in the art.

The various illustrative components, blocks, modules, circuits and algorithms described in connection with the embodiments disclosed herein may be implemented, as hardware, software or combinations of both. To clearly illustrate this interchangeability of hardware and software, various illustrative components, blocks, modules, circuits, algorithms may have been described generally in terms of their functionality. Whether such functionality is implemented as hardware or software depends on the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An electric powered vehicle configured to operate without exceeding a maximum horsepower, comprising:
    a drive wheel;
    an electric motor having a horsepower rating greater than the maximum horsepower, the electric motor being configured to rotate the drive wheel;
    a throttle configured to produce a throttle voltage;
    a speed sensor configured to monitor rotational speed of the drive wheel; and
    a controller configured to determine the maximum voltage that can be applied to the electric motor at the current rotational speed of the drive wheel without exceeding the maximum horsepower, and limit the throttle voltage applied to the electric motor to the maximum voltage.

2. The electric powered vehicle of claim 1 wherein the controller is configured to limit the throttle voltage by comparing the throttle voltage produced by the throttle to the maximum voltage and, if the throttle voltage produced by the throttle exceeds the maximum voltage, reducing the throttle voltage to the maximum voltage before the throttle voltage is applied to the electric motor.

3. The electric powered vehicle of claim 1 wherein the controller is configured to determine the maximum voltage as a function of the torque constant of the electric motor.

4. The electric powered vehicle of claim 1 wherein the controller is configured to determine the maximum voltage as a function of the resistance of the electric motor.

5. The electric powered vehicle of claim 1 wherein the controller is configured to determine the maximum voltage as a function of the back EMF developed by the electric motor.

6. The electric powered vehicle of claim 1 wherein the controller is configured to determine the maximum voltage only when the current rotational speed of the drive wheel exceeds a threshold speed.

7. The electric powered vehicle of claim 6 wherein the controller is further configured to determine the voltage required by the electric motor to produce a target torque at the current rotational speed of the drive wheel when such speed is less than the threshold speed, and set the throttle voltage to such voltage.

8. The electric powered vehicle of claim 7 wherein the controller is further configured to determine whether the drive wheel is accelerating when the current rotational speed of the drive wheel is less than the threshold speed, and adjust the target torque if the drive wheel is not accelerating.

9. An electric powered vehicle, comprising:
   a drive wheel;
   an electric motor configured to rotate the drive wheel;
   a throttle configured to produce a throttle voltage;
   a speed sensor configured to monitor rotational speed of the drive wheel; and
   a controller configured to determine the voltage required by the electric motor to produce a target torque at the current rotational speed of the drive wheel when such speed is less than a threshold speed, and set the throttle voltage to such voltage.

10. The electric powered vehicle of claim 9 wherein the controller is further configured to determine whether the drive wheel is accelerating when the current rotational speed of the drive wheel is less than the threshold speed, and adjust the target torque if the drive wheel is not accelerating.

11. A method of controlling an electric powered vehicle configured to operate without exceeding a maximum horsepower, comprising:
   rotating a drive wheel with an electric motor having a horsepower rating greater than the maximum horsepower;
   monitoring the rotational speed of the drive wheel;
   determining the maximum voltage that can be applied to the electric motor at the current rotational speed of the drive wheel without exceeding the maximum horsepower;
   producing a throttle voltage; and
   limiting the throttle voltage applied to the electric motor to the maximum voltage.

12. The method of claim 11 wherein the throttle voltage is limited by comparing the throttle voltage to the maximum voltage and reducing the throttle voltage to the maximum voltage when the throttle voltage exceeds the maximum voltage.

13. The method of claim 12 wherein the maximum voltage is determined as a function of the torque constant of the electric motor.

14. The method of claim 12 wherein the maximum voltage is determined as a function of the resistance of the electric motor.

15. The method of claim 12 wherein the maximum voltage is determined as a function of the back EMF developed by the electric motor.

16. A method of controlling an electric powered vehicle, comprising:
   rotating a drive wheel with an electric motor;
   monitoring the rotational speed of the drive wheel;
   determining the voltage required by the electric motor to produce a target torque at the current rotational speed of the drive wheel; and
   setting the throttle voltage to such voltage.

17. The method of claim 16 further comprising determining whether the drive wheel is accelerating when the current rotational speed of the drive wheel, and adjusting the target torque if the drive wheel is not accelerating.

18. An electric powered vehicle configured to operate without exceeding a maximum horsepower, comprising:
   a drive wheel;
   a throttle;
   an electric motor having a horsepower rating greater than the maximum horsepower, the electric motor being configured to rotate the drive wheel in response to an input from the throttle;
   a speed sensor configured to monitor rotational speed of the drive wheel; and
   a controller configured to limit the throttle input to the electric motor to ensure that the torque produced by the electric motor does not exceed the maximum horsepower at the current rotational speed of the drive wheel.

19. An electric powered vehicle, comprising:
   a drive wheel;
   a throttle;
   an electric motor configured to rotate the drive wheel in response to an input from the throttle;
   a speed sensor configured to monitor rotational speed of the drive wheel; and
   a controller configured to determine the throttle input required by the electric motor to produce a target torque at the current rotational speed of the drive wheel when such speed is less than a threshold speed, and set the throttle input thereto.

* * * * *